Dec. 16, 1924.
B. DE VORE
WHIP FOR CREAMS, SAUCES, ETC
Filed Feb. 5, 1923
1,519,606
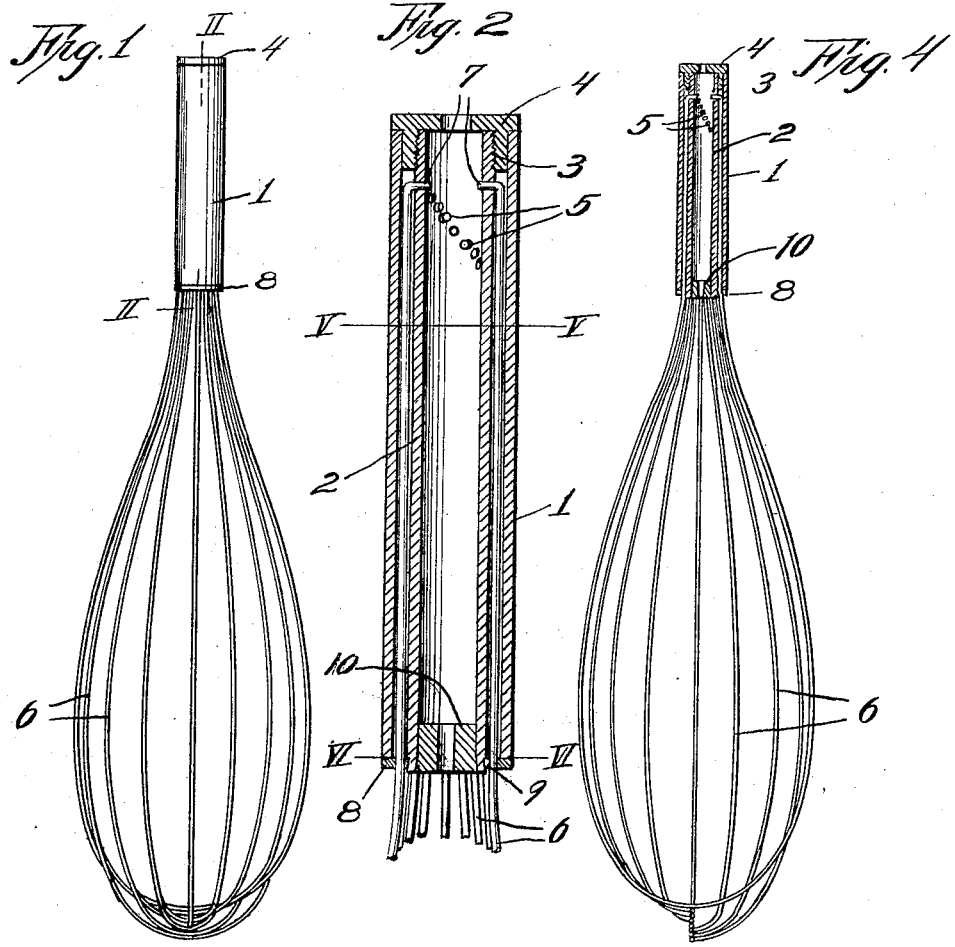
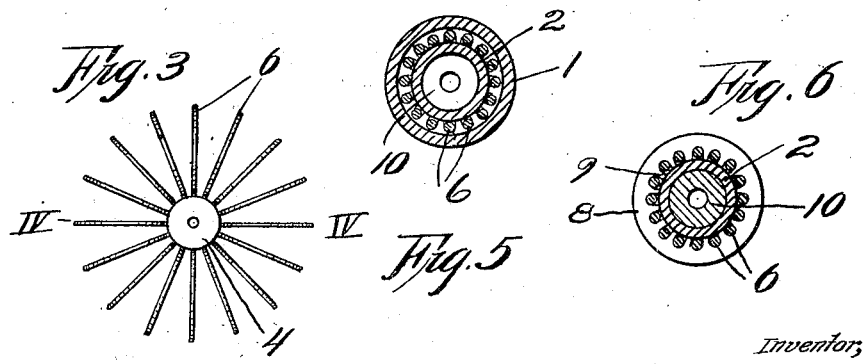
Witness:
R. E. Hamilton
Inventor:
Belford DeVore,
By Thorpe & Gerard,
Attys.

Patented Dec. 16, 1924.

1,519,606

UNITED STATES PATENT OFFICE.

BELFORD DE VORE, OF KANSAS CITY, MISSOURI, ASSIGNOR TO CHARLOTTE HOSKINS, OF KANSAS CITY, MISSOURI.

WHIP FOR CREAMS, SAUCES, ETC.

Application filed February 5, 1923. Serial No. 616,948.

*To all whom it may concern:*

Be it known that I, BELFORD DE VORE, a citizen of the United States, and resident of Kansas City, county of Jackson, State of Missouri, have invented a certain new and useful Improvement in Whips for Creams, Sauces, Etc., of which the following is a complete specification.

This invention relates to whips or beaters for whipping cream or beating eggs and the like, and has for its object to produce a device of this character to be operated by hand or as a part of a machine to be operated by hand or motor, where large quantities of cream, eggs or the like are to be whipped or beaten, which may be quickly and efficiently cleaned for sanitary reasons, and may be repaired when necessary.

With the object named in view, the invention consists in certain novel and useful features of construction and organization of parts as hereinafter described and claimed; and in order that it may be fully understood, reference is to be had to the accompanying drawing, in which:—

Figure 1 represents a side view of the device embodying the invention;

Figure 2 is an enlarged section on the line II—II of Figure 1;

Figure 3 is a top plan view of the device;

Figure 4 is a section taken on the line IV—IV of Figure 3;

Figure 5 is a section taken on the line V—V of Figure 2; and

Figure 6 is a section taken on the line VI—VI of Figure 2.

In the said drawing, where like reference characters identify corresponding parts in all of the figures, 1 and 2 respectively identify, the outer and inner members of a stock, said members being spaced apart a distance slightly greater than the diameter of certain beaters hereinbelow described. The inner member is threaded at its upper end as at 3 for engagement with a threaded plug 4, sweated or otherwise permanently secured within the upper end of the outer stock member 1, as illustrated. It will be understood, in this connection, that the top of the stock may be formed in any suitable manner for engagement with mechanism for hand or power operation.

At some distance below the threaded portion, the stock member 2 is formed, as illustrated, with a double series of perforations 5, arranged in pairs at diametrically opposite points, each pair being spaced below the next above pair, a distance substantially equal to the diameter of the beaters.

The beaters each consist of a wire 6 formed at its opposite ends with right-angle shaped hooks or angular portions 7, and, by preference, are made of spring metal, although it will be apparent that they may be made of any other suitable wire.

The device is assembled as follows: The hooks 7 of a beater member are engaged with the uppermost pair of openings 5, and thereafter progressively downward, the beaters at their lower ends being thus progressively spaced downward as shown most clearly in Figure 4, each loop being in contact with its neighbors, due to the fact that the distance between the perforations is substantially equal to the diameter of the beaters and to the fact that all of the beaters are of equal length.

In order to maintain the beaters in engagement with the inner stock member 2 when the device is disassembled for cleaning or the like and also to maintain the beaters properly spaced when in use, a ring 8 provided with a plurality of notches 9 for the reception of the beaters is now slipped over the end of the member 2, and the notches are engaged with the wires. The parts thus assembled are projected into the open end of the member 1, the ring 8 being forced downwardly through abutment with the open end of the member 1 and the threads 3 of the inner member are finally engaged with the cap 4, as will be readily understood. It has been found desirable to close the open end of the member 2 with a plug 10 to prevent the entry of milk or eggs into the stock.

It will be evident that the device may be readily disassembled for cleaning without necessitating the removal and replacement of every beater wire, as the ring 8 will efficiently retain the beaters with their hooks 7 engaged in the perforations 5. It will also be evident from the above description that all of the beaters are standard and are readily interchangeable, and that the only care necessary in assembling the device is to make sure that the uppermost pair of openings 5 are first engaged and from that point progressively downward.

From the above description it will be apparent that I have produced a device of the character described, which possesses all of the features of advantage set forth as desirable, and while I have described and claimed the preferred embodiment of the same, I reserve the right to make all changes properly falling within the spirit and scope of the appended claims.

I claim:

1. In a device of the character described, the combination of a stock formed of two cylindrical members having threaded engagement at one of their ends, the inner member being formed with a series of perforations and projecting at one end slightly beyond the outer member, a series of looped beaters fitting between said members and extending beyond the same and having their ends inturned to form hooks for engagement with said series of perforations, and a notched spacing ring for said beaters slidingly received on the projecting end of the inner member adjacent the opposite ends of said members from said perforations.

2. In a device of the character described, the combination of a stock formed of two cylindrical members having threaded engagement at one end of their ends, the inner member being formed with a series of perforations and projecting at its opposite end beyond the outer member, a series of looped beaters fitting between said members and extending beyond the same and having their ends inturned to form hooks for engagement with said series of perforations, and a notched spacing ring for said beaters slidingly received on the projecting end of said inner member.

3. In a device of the character described, the combination with a stock, of a plurality of looped beaters detachably secured to said stock, and a spacing ring formed with notches in its inner periphery adapted for engagement with and separation of said beaters.

4. In a device of the character described, the combination with a stock, of a plurality of looped beaters having angular portions detachably secured in said stock, and a spacing ring formed with notches in its inner periphery adapted for engagement with and separation of said beaters.

5. In a device of the character described, the combination of a stock formed of two cylindrical members detachably secured together, the inner member being formed with a series of perforations, a series of looped beaters fitting between said members and extending beyond the same and having their ends formed with angular portions for engagement with said series of perforations, and a spacing ring having a series of notches in its inner periphery for engagement with and separation of said beaters.

In witness whereof I hereunto affix my signature.

BELFORD DE VORE.